United States Patent [19]
Ferrell

[11] Patent Number: 5,885,083
[45] Date of Patent: Mar. 23, 1999

[54] SYSTEM AND METHOD FOR MULTIMODAL INTERACTIVE SPEECH AND LANGUAGE TRAINING

[75] Inventor: Joe G. Ferrell, Arlington, Tex.

[73] Assignee: Raytheon Company, Lexington, Mass.

[21] Appl. No.: 878,685

[22] Filed: Jun. 19, 1997

Related U.S. Application Data

[63] Continuation of Ser. No. 631,692, Apr. 9, 1996, abandoned.

[51] Int. Cl.$^6$ .............................. G09B 19/00; G09B 19/06
[52] U.S. Cl. ............................................. 434/156; 434/157
[58] Field of Search .................... 434/156, 157, 434/167, 169, 185, 323

[56] References Cited

U.S. PATENT DOCUMENTS 5,302,132  4/1994  Corder .................................... 434/156
5,340,316  8/1994  Javkin et al. .

FOREIGN PATENT DOCUMENTS 90 01203  2/1990  European Pat. Off. .
94 20952  9/1994  European Pat. Off. .
95 09506  4/1995  European Pat. Off. .
0 685 523  8/1995  European Pat. Off. .

OTHER PUBLICATIONS

Desmarais, Norman; Learning Language on Disc; CD–ROM Professional vol. 8,No. 4,pp. 44–58, Apr. 1995.
TriplePlay Plus! User's Manual, 1994–96.

*Primary Examiner*—Richard J. Apley
*Assistant Examiner*—John Rovnak
*Attorney, Agent, or Firm*—W. C. Schubert; G. H. Lenzen, Jr

[57] ABSTRACT

A system and method for multimodal interactive speech training include selecting a modality (10) corresponding to various sensory stimuli to present non-native vocabulary elements (12) to an individual to train the individual to immediately respond (16) to a presented word, situation, or data without performing a time-consuming literal translation or other complex cognitive process. The system and method include speech synthesis, speech recognition, and visual representations of non-native vocabulary elements to promote rapid comprehension through neuro-linguistic programming of the individual.

19 Claims, 5 Drawing Sheets

SYSTEM AND METHOD FOR MULTIMODAL INTERACTIVE SPEECH AND LANGUAGE TRAINING

This is a continuation application of Ser. No. 08/631,692, filed Apr. 9, 1996, now abandoned.

TECHNICAL FIELD

The present invention relates to a system and method for speech and language training which utilizes multiple modalities and multiple sensory interaction to teach key vocabulary elements such as phonemes, words, and phrases to evoke a reflexive response.

BACKGROUND ART

Theories of human information processing and learning are continually emerging and evolving, first in the psychological sciences and later in computer science in an effort to model human intelligence in one form or another. At least one theory of human information processing associates various processing events or tasks with a corresponding time which increases by a factor of about ten for each level of task. The lowest level tasks are performed most rapidly and involve purely physical and chemical reactions to produce a response. For example, a reflexive act is constrained by the time it takes for a stimulus to provoke an action potential in a neuron followed by a synaptic transfer to the central nervous system which evokes a response in the motor system, such as a muscle movement. The individual has no control over such actions (a knee-jerk reflex reaction for example) which occur on the order of about 10 mS.

Deliberate actions are those which use available knowledge to choose a particular response over other available responses. Such actions require additional time to complete—on the order of 100 mS to one second. Deliberate acts may be further characterized as automatic acts or controlled acts with automatic acts requiring the former time to complete and controlled acts requiring the latter. Empirical data support this distinction and suggest that automatic behavior occurs by largely parallel neurological processing while controlled behavior occurs by largely sequential neurological processing. This is supported by the constraint imposed by the underlying biological processes involved in transmission of neurological signals.

More demanding cognitive tasks require assembling a collection of deliberate acts in order to compose an appropriate response to a particular stimulus. These tasks may require one to ten seconds or more. The time required for such tasks is a function of the time required to recall appropriate knowledge and apply it to the stimulus. This time may often be reduced with practice as suggested by the power law of practice (the logarithm of the response time varies as a function of the logarithm of the number of trials).

Language processsing of non-native vocabulary elements or unfamiliar vocabulary elements in one's native language is one example of a demanding cognitive process which requires a processing time on the order of seconds. This process may involve perception of an unfamiliar vocabulary element, memory recall to identify the vocabulary element and associate it with a corresponding familiar vocabulary element, determination of an appropriate response, and memory recall to associate the appropriate response with a corresponding unfamiliar vocabulary element. In contrast, a stimulus which triggers a familiar element may evoke a deliberate automatic response which may be performed in a second or less depending upon the particular situation, since the more complex cognitive tasks of assembling deliberate acts is not required.

While realization of a global marketplace may eliminate barriers to travel and trade, fundamental communication skills are essential but continue to hinder progress toward that goal. Business transactions may not be significantly impacted by language obstacles due to the availability of translators in the form of bilingual individuals, computer systems, or pocket dictionaries. However, a number of individuals are required to perform time-critical tasks which must transcend the hurdles imposed by different languages or unfamiliar terms specific to a particular job or environment, i.e. jargon. For example, air traffic controllers, pilots, law enforcement personnel, military personnel, and the like perform numerous time-critical tasks which demand a correct, immediate response to verbal, written, or other graphical communications which may be in languages other than their native language. These individuals must often respond immediately to a presented word, situation, or data without waiting for a literal language translation or another time-consuming cognitive process.

A number of professions, including those mentioned above, also include a significant number of vocabulary elements which are specific to the profession or the geographical region. Experienced individuals are capable of assimilating these terms such that the terms become familiar enough to elicit an immediate accurate response if necessary. Orientation of new individuals to unfamiliar vocabulary terms which may be used in these situations, such as jargon or slang, may require a significant period of time.

A number of prior art language or vocabulary training programs present material using multi-sensory methods but focus on traditional language learning theories which include semantic, syntactic, and grammatic memorization. These methods typically require a significant amount of time to teach fundamental communication skills, especially for older students. Furthermore, once the unfamiliar vocabulary and "rules" are memorized, literal translation requires significant cognitive processing which slows reaction time.

By excluding speech recognition, prior art training systems eliminate vital cognitive tasks which may lead toward increased comprehension and communication skills. These systems are often rigidly structured and do not support the dynamics essential to individual learning.

DISCLOSURE OF THE INVENTION

It is thus an object of the present invention to provide a system and method for multimodal interactive speech and language training which incorporate sensory preview, instructional comprehension and interactive memory recall exercises based upon proven sensory integration exercises.

A further object of the present invention is to provide a system and method for vocabulary element training which include a flexible structure which supports the dynamics essential to individual learning.

Another object of the present invention is to provide a system and method for teaching unfamiliar vocabulary elements which allow individuals having various native languages to quickly learn to respond correctly to non-native vocabulary elements.

A still further object of the present invention is to provide a system and method for speech and language training which use proven sensory-motor interaction exercises to increase the learning efficiency in addition to improving memory recall and perception skills.

Yet another object of the present invention is to provide a system and method for instantiation of unfamiliar vocabulary elements which utilize digitized and compressed human speech, synthesized speech, and speech recognition in addition to visual and tactile interfaces to excite multiple neural paths in receiving and expressing vocabulary elements and comprehension checks.

A still further object of the present invention is to provide a system and method for speech and language training which use sensory-motor interaction exercises to promote rapid training in the correct immediate reaction to the introduction of an unfamiliar vocabulary element whether presented aurally, or visually as a graphical or textual representation.

In carrying out the above objects and other objects and features of the present invention, a system and method for training an individual to respond to unfamiliar vocabulary elements include selecting at least one of a plurality of modalities corresponding to different sensory stimuli to present unfamiliar vocabulary elements to the individual and presenting the unfamiliar vocabulary elements using the selected modality. The system and method also include pausing for a time sufficient for the individual to respond to the vocabulary element, receiving a response from the individual based on the unfamiliar element, evaluating the response based on a predetermined desired response criteria, and providing feedback to the individual using at least one of the plurality of modalities.

The present invention provides a system and method for instantiation of correct responses to spoken, written, or graphically symbolic vocabulary elements such as phonemes, words, and phrases preferably using computer-based training designed to produce neuro-linguistic programming in the student. In a preferred embodiment, a system or method according to the present invention utilizes a multi-modal and multi-sensory Preview Phase followed by a Word Comprehension Phase and a Memory Recall Phase. The Preview Phase includes options for completing new exercises in addition to review exercises which include Element Training, Graphic Training, and Sight Recognition exercises. The Word Comprehension Phase includes sentence completion, graphic identification, and word choice exercises while the Memory Recall Phase includes Graphic Memory, Word Recognition, and Story Completion exercises.

In a preferred embodiment, a specially designed, interactive, PC-based multimedia training system includes control logic or software to implement a method according to the present invention.

The advantages accruing to the present invention are numerous. For example, the present invention allows any individual, regardless of education or experience to rapidly gain the necessary skills to perform time-critical response tasks for his job. The present invention provides a system and method which are completely self-paced and individualized. Speech synthesis provides an audio stimulus while speech recognition recognizes the correctness of the student response. Incorporation of proven sensory integration techniques increases the learning efficiency while improving memory recall and perception skills. Positive feedback improves student motivation by using the student's name in responses as well as colorful graphics to inspire the student to speak the unfamiliar vocabulary elements as accurately as possible.

The above objects and other objects, features, and advantages of the present invention will be readily appreciated by one of ordinary skill in this art from the following detailed description of the best mode for carrying out the invention when taken in connection with the accompanying drawings.

BEST MODE(S) FOR CARRYING OUT THE INVENTION

Figure 1:
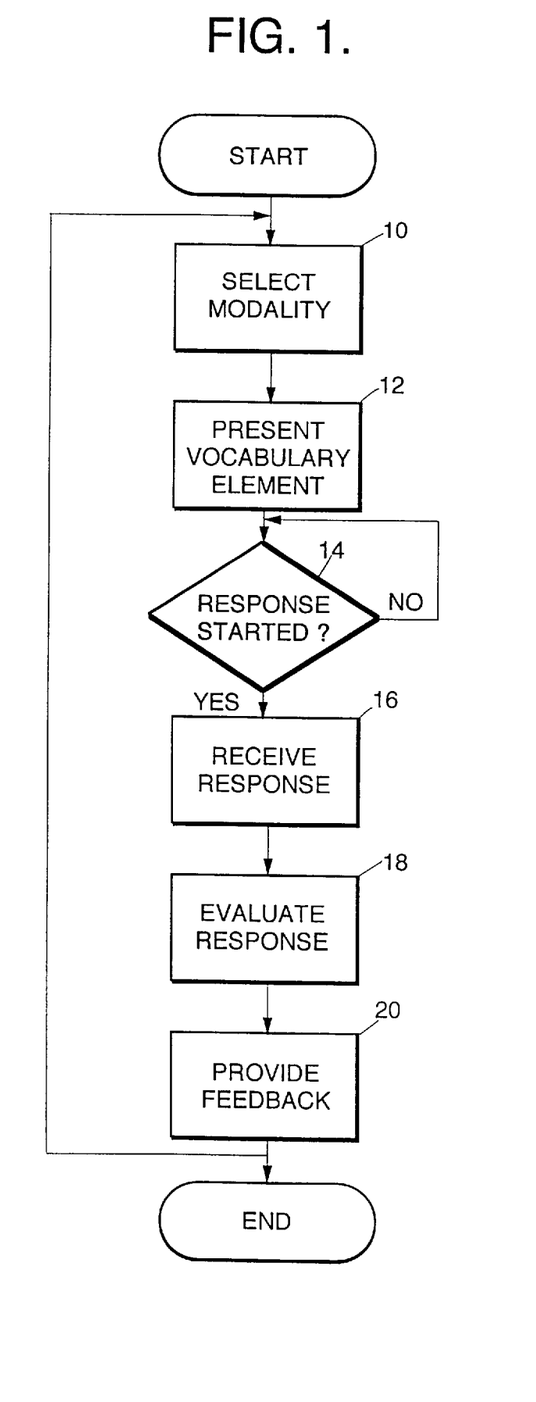
FIG. 1 is a flow chart illustrating a system or method for multimodal speech and language training according to the present invention.

Referring now to FIG. 1, a flow chart illustrating a system and method for multimodal interactive training is shown. While the flow chart illustrates a sequential process, one of ordinary skill in the art will recognize that a system or method according to the present invention may be implemented using other techniques without departing from the spirit or scope of the present invention. While a preferred embodiment of the present invention is implemented by a programmed computer, the present invention transcends the particular hardware platform, operating system, programming method, and programming language, as indicated by the appended claims.

As illustrated in FIG. 1, one or more of a plurality of modalities is selected to present an unfamiliar vocabulary element to an individual as represented by block 10. Regardless of whether an individual has one or more native languages, the present invention provides a system and method for rapid acquisition of unfamiliar vocabulary elements whether in a native language or a non-native language by implanting the unfamiliar vocabulary elements into the individual's established neuro-linguistic syntax and linking them to a correct mental or motor response.

An unfamiliar vocabulary element is presented to the individual using one or more modalities selected in block 10 as represented by block 12 of FIG. 1. A vocabulary element may be a phoneme, word, phrase, sentence, or paragraph. Preferably, a vocabulary element, such as a word or phrase, is presented both visually and aurally to the individual. The visual presentation may include displaying a word or phrase on a video screen within a sentence. The aural presentation preferably includes a synthesized utterance corresponding to the vocabulary element. This process is illustrated and explained in greater detail with reference to FIG. 2 below. Also preferably, the presentation is divided into multiple lessons incorporating new vocabulary elements with previously presented (review) vocabulary elements.

The individual is given a period of time to initiate a response as indicated by block 14. If no response is initiated within the time period, the process may continue by presenting additional vocabulary elements or may provide a prompt using more familiar vocabulary (which may be in the user's native language for foreign language applications) to assist the user in understanding the unfamiliar vocabulary element. In a preferred embodiment, vocabulary elements for which an incorrect response or no response is given are added to a review list and presented at a later date or time.

With continuing reference to FIG. 1, the user's response is received as represented by block 16. The user may respond using one or more input devices as illustrated and described in detail with reference to FIG. 3. For example, the user may pronounce the vocabulary element while pointing to a visual representation of the vocabulary element. This improves the efficiency of learning and ability of recall due to multi-sensory integration. The response (or responses) are evaluated for correctness as indicated by block 18 and appropriate feedback is presented to the user based on the correctness of the response as indicated by block 20.

In a preferred embodiment, the feedback includes both visual and aural feedback. Visual feedback is provided by a needle gauge at the bottom of the screen which indicates the degree of correct pronunciation. The aural feedback is coupled with the visual feedback and includes a synthesized voice which speaks the user's name along with an encouraging response such as "Ron, that's close, let's try it again." The user is given three opportunities to correctly say the utterance before moving on to the next vocabulary element. An incorrect response is preferably recorded in a review file to be repeated until mastery occurs. Sample screens are illustrated and described with reference to FIGS. 4 and 5. This process may be repeated for a number of unfamiliar vocabulary elements which are preferably grouped in lessons having nine new elements.

Figure 2:
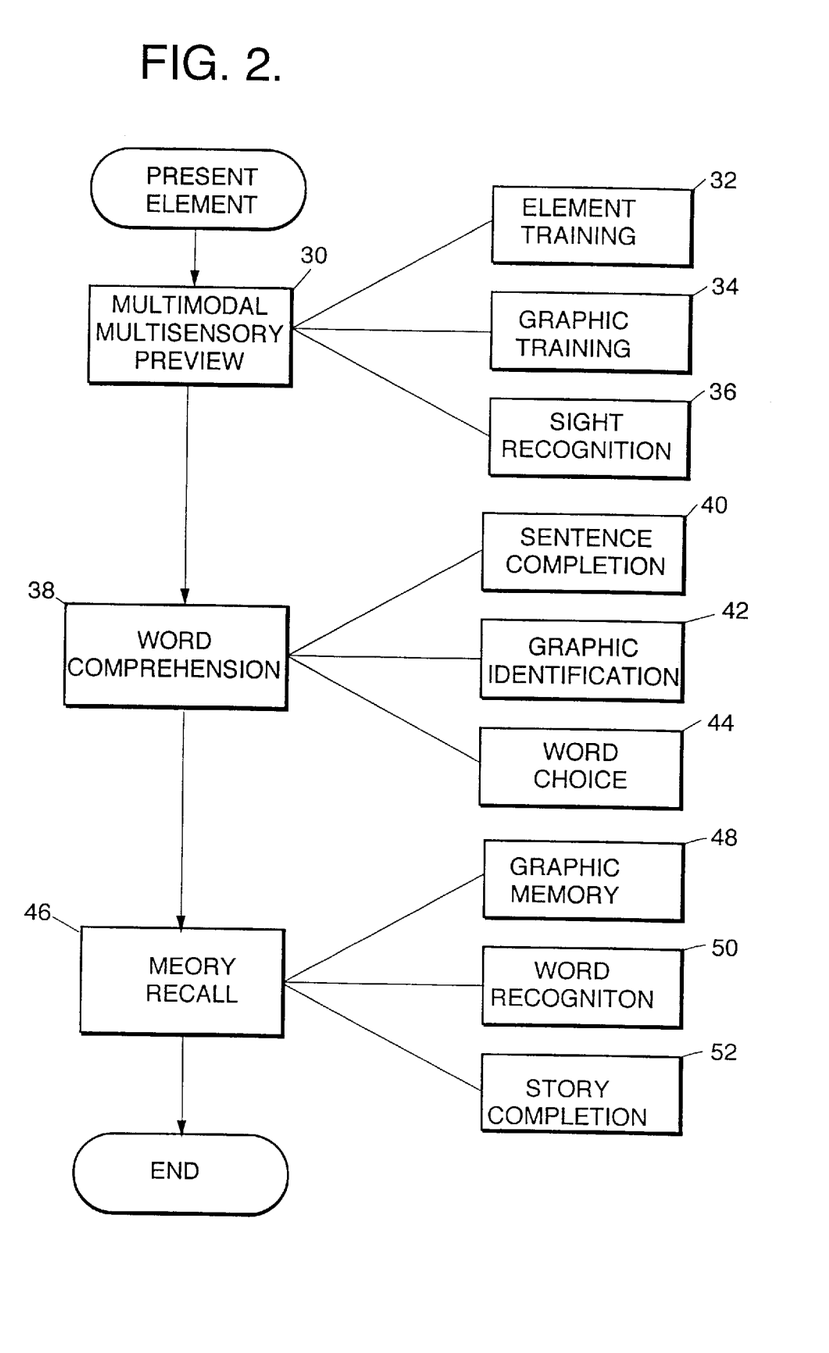
FIG. 2 is a more detailed flow chart/block diagram illustrating presentation of unfamiliar vocabulary elements to an individual.

Referring now to FIG. 2, a flow chart/block diagram illustrates a preferred embodiment of a system or method for multimodal interactive training according to the present invention. As illustrated, each lesson or exercise is divided into three main sections including a Multimodal Multisensory Preview 30, Word Comprehension 38, and Memory Recall 46. Multisensory preview 30 teaches and introduces an unfamiliar vocabulary element, such as a word, along with a definition and a graphical representation, such as a picture.

Multisensory preview 30 prepares the individual for the unfamiliar vocabulary elements to be learned. Research has shown that a preview of the material greatly increases comprehension and retention when instruction follows such a preview phase. Preferably, each lesson includes nine vocabulary elements, such as words or phrases, which may be selected from new vocabulary elements or previously presented vocabulary elements. Each third lesson is preferably a complete review of previously presented vocabulary elements.

Multisensory preview 30 includes Element Training 32, Graphic Training 34, and Sight Recognition 36. As with Word Comprehension 38 and Memory Recall 46, Multisensory Preview 30 includes a sensory input stimulus, such as a visual and/or auditory presentation, designed to evoke a motoric response, such as speech or a tactile response. Element training 32 allows the user to gain greater comprehension by understanding the meaningfulness of the presented vocabulary element. Preferably, a visual presentation of the vocabulary element and its context is followed by an auditory presentation of the same. The user then provides a speech response by repeating the vocabulary element while viewing the visual presentation.

Graphic Training 34 is used to promote visualization of the unfamiliar vocabulary element and to enhance its meaningfulness to the user. Preferably, a visual presentation of the vocabulary element with an associated graphic is followed by an auditory presentation of the vocabulary element along with a contextual phrase. The user then has the choice of a tactile or speech response while viewing the visual presentation.

Sight Recognition 36 is performed using a tachtiscopic flash to trigger visual memory as a sensory input. Preferably a visual flash of the unfamiliar vocabulary element evokes a speech response which relies on a phonological memory link to visual recall in the user.

After finishing exercises for the Multisensory Preview 30, Word Comprehension exercises are performed as represented by block 38 of FIG. 2. Word Comprehension 38 provides practice for learning vocabulary element recognition, definition and usage. Word Comprehension 38 includes Sentence Completion 40, Graphic Identification 42, and Word Choice 44. Sentence Completion 40 includes presentation of a sentence with an omitted vocabulary element or elements. The user must select the correct answer from a field of nine possibilities. The user may activate a "hear" icon or button (best illustrated in FIGS. 4 and 5) to hear the sentence produced by a synthesized voice. After the first incorrect response, a solid line for the missing element changes to a correct number of dashes representing the number of letters and spaces. After two incorrect responses, the first and last letter appear in the blanks. After three incorrect responses, about half of the letters appear in the blanks.

Graphic Identification 42 includes visual presentation of three graphics representing three unfamiliar vocabulary elements. An aural presentation of one of the elements prompts the user to respond. The aural presentation may be of the element itself or its definition, as selected by the user or randomly selected by the system. The user then selects the correct graphic using an input device (best illustrated in FIG. 3). Regardless of the response, three new graphics are then visually presented in random order. This cycle continues until a correct response has been entered for all of the nine graphics.

Word Choice 44 visually presents all nine vocabulary elements of the current lesson. An aural presentation of the unfamiliar vocabulary element or its definition (selectable option) prompts the user to select the corresponding element with an input device. Again, regardless of response, a new element (or its definition) is presented. Correct responses remain on display while additional elements or definitions are presented until a correct response is provided for each element.

Memory Recall 46 of FIG. 2 includes additional exercises designed to improve memory retention and recall after completion of Word Comprehension 38. Memory Recall 46 includes exercises for Graphic Memory 48, Word Recognition 50, and Story Completion 52. Graphic memory 48 includes visual presentation of a single graphic or word. The user responds by pronouncing the appropriate word which is analyzed by a speech recognizer. Graphics or words are randomly presented until all are correctly identified. Word Recognition 50 includes visual presentation of three words or graphics accompanied by aural presentation of one of the three. The user must select the correct match with an input device (best illustrated in FIG. 3). Graphics or words are randomly presented until a correct response is provided for each of the vocabulary elements.

Story Completion 52 includes visual presentation of a paragraph with four or five vocabulary elements absent. The user can select an aural presentation by activating a corresponding icon or button (best illustrated in FIGS. 4 and 5). A number of response modes are available to the user. The user may select a vocabulary element from a list using an input device for each of the omitted elements. When the user has finished responding, all responses are evaluated.

Figure 3:
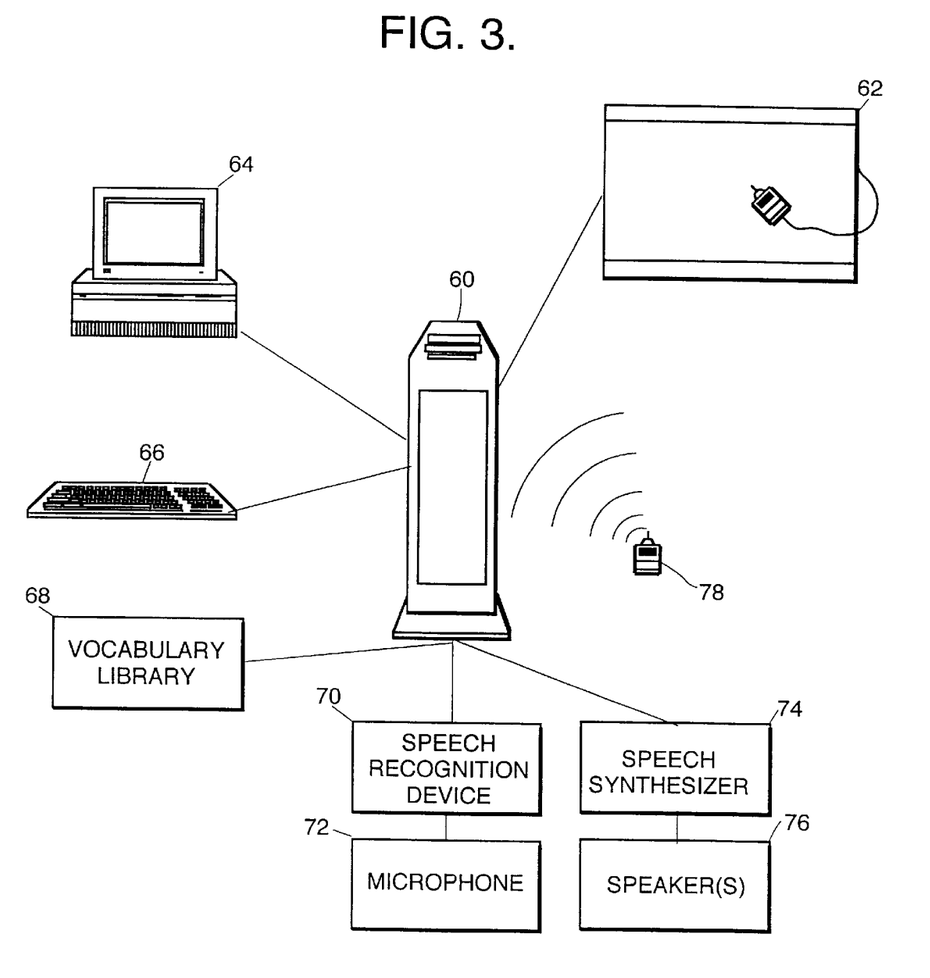
FIG. 3 is a block diagram illustrating a system for multimodal speech and language training according to the present invention.

Referring now to FIG. 3, a block diagram illustrating a system for multimodal interactive training according to the present invention is shown. The system includes a processor 60 which includes control logic for implementing a method according to the present invention as described with reference to FIG. 1 and FIG. 2. Processor 60 is in communication with input devices such as digitizing tablet 62, keyboard 66, microphone 72, and wireless mouse 78. A video display 64 is used to present text and graphics to the individual and is also in communication with processor 60. Of course various other input devices could be used to allow a tactile response from the user without departing from the spirit or scope of the present invention.

With continuing reference to FIG. 3, a digitized vocabulary library 68 may be stored within processor 60 or in an external non-volatile storage media in communication with processor 60. Speech recognition device 70 utilizes microphone 72 to capture and analyze audio input from the user. Similarly, speech synthesizer 74 and speaker(s) 76 are used to aurally present vocabulary elements to the user. Of course, various components of the system illustrated may be implemented in software, hardware, or a combination of software and hardware without departing from the spirit or scope of the present invention as such implementations are merely a matter of design choice. For example, speech recognition device 70 may include a dedicated digital signal processor with associated software to convert audio information acquired by microphone 72 into a data stream which is communicated to processor 60. Speech recognition device 70 and speech synthesizer 74 may be located in the same chassis as processor 60, sharing a common backplane, or may be remotely located near the user and communicate via a network.

In operation, processor 60 includes appropriate control logic preferably in the form of software to present visual stimuli, such as text and graphics, on display 64. Aural presentation of vocabulary elements utilizes speech synthesizer 74 and speaker(s) 76. The user may respond using one or more input devices, such as keyboard 66, mouse 78, tablet 62, or microphone 72. Vocabulary library 68 includes recorded digitized representations of vocabulary elements which may be used by speech recognition device 70 to evaluate the correctness of a response or by speech synthesizer 74 to form an audio representation of the vocabulary elements.

Figure 4:
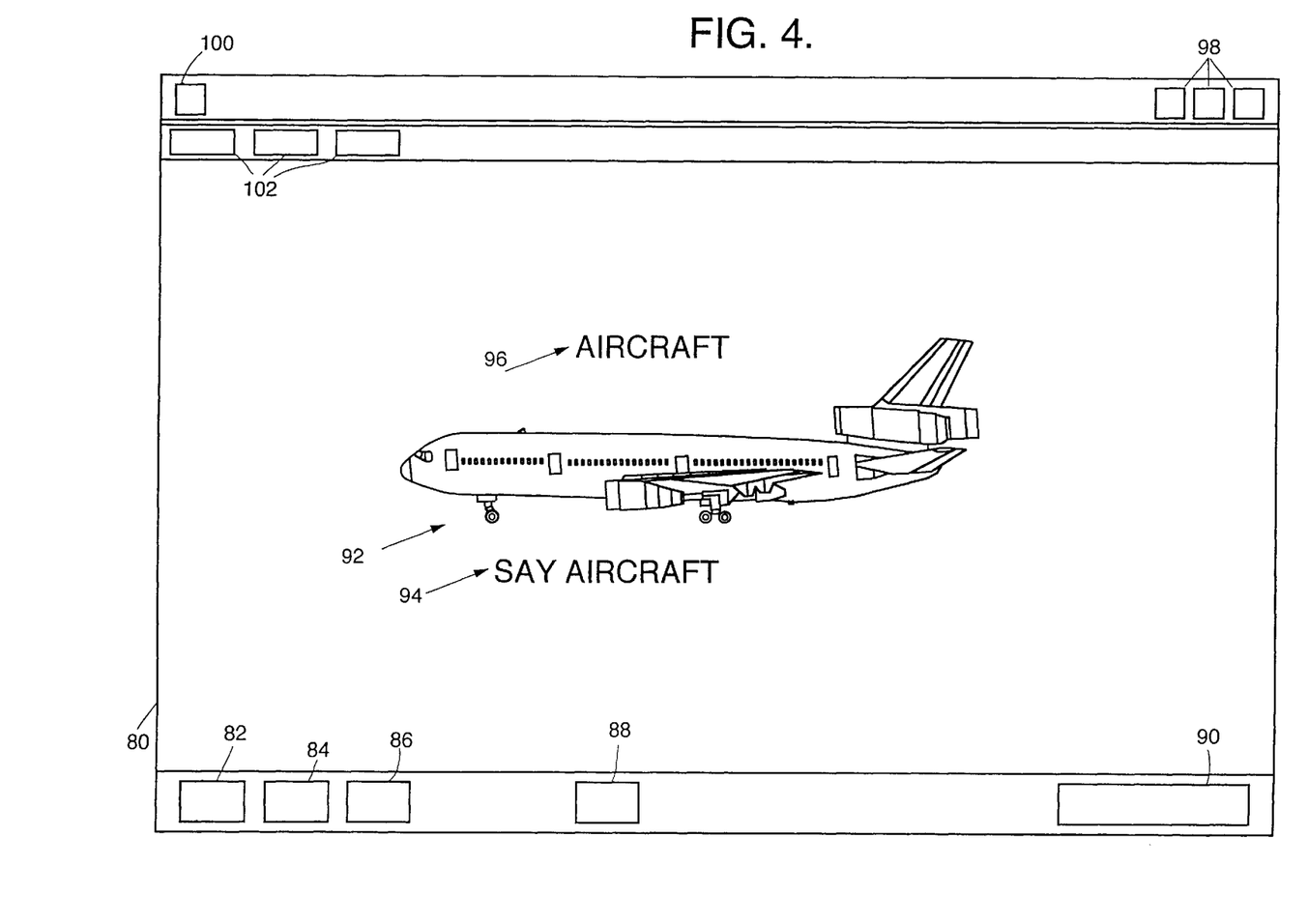
FIG. 4 illustrates one example of a computer screen used in one embodiment of a training system according to the present invention.
Figure 5:
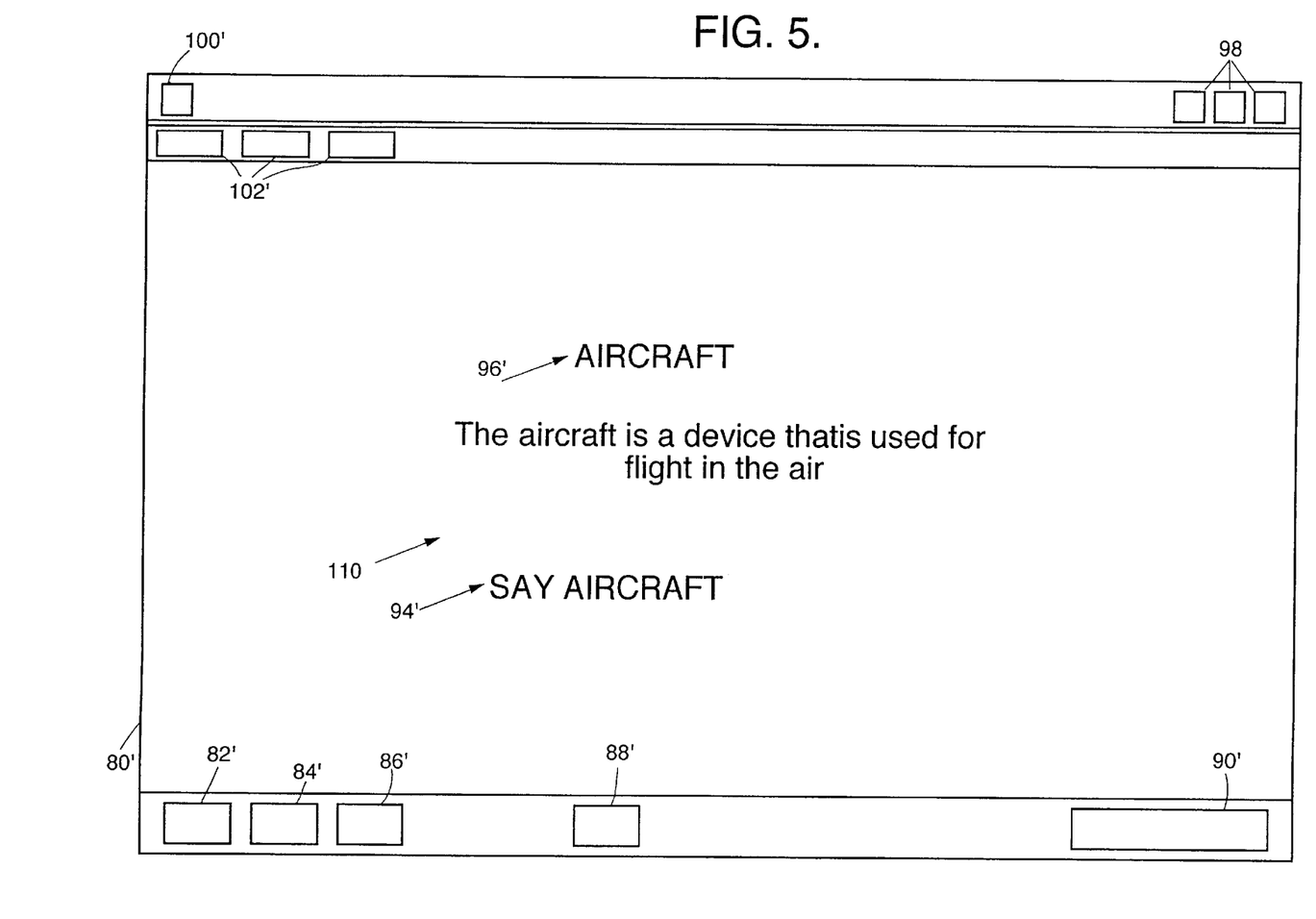
FIG. 5 illustrates another example of a computer screen used in one embodiment of a training system according to the present invention.

FIGS. 4 and 5 illustrate representative screen displays which may be presented to the user via display 64. For ease of illustration, icons are generally represented by blank boxes. Of course, the present invention is independent of the particular icons selected or the particular screen layout illustrated. Rather, the screen representations of FIGS. 4 and 5 illustrate the multimodal approach to speech and language training of the present invention. Primed reference numerals of FIG. 5 indicate items of similar structure and function illustrated and described with reference to FIG. 4.

As shown in FIG. 4, a window 80 contains a number of graphical representations or icons 82, 84, 86, 88, 90, 98, and 100. In addition, window 80 includes an area for presenting a particular vocabulary element, indicated generally by reference numeral 96, a graphical presentation area 92, and a contextual area 94. Window 80 also includes control icons 98 and 100 which allow manipulation of the display window 80. Similarly, menu items 102 allow the user to select various options related to the training lessons.

In a preferred embodiment, icon 82 is a microphone icon which is activated when the user is asked to provide a verbal response. Icon 84 provides visual feedback in the form of a confidence meter which indicates the correctness of a user response. Activation of icon 86 allows the user to repeat presentation of a particular vocabulary element.

Activation of icon 88 changes contextual presentation from one or more unfamiliar vocabulary elements to those which are more familiar. For example, in a foreign language training application, icon 88 may be a flag which represents the user's native language. If the user is having difficulty comprehending a particular vocabulary element or graphical representation, activation of icon 88 presents a description in the user's native language. Other icons, such as icon 90, may be used to indicate progress or level of difficulty of the particular exercise. As illustrated in FIGS. 4 and 5, graphical presentation area 92 may be replaced by contextual information 110 depending upon the particular lesson or exercise being performed.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A method for training an individual to recognize and respond to at least one unfamiliar vocabulary element, the method comprising:

selecting the at least one unfamiliar vocabulary element from a plurality of new and previously presented unfamiliar vocabulary elements;

automatically presenting a lesson for the at least one unfamiliar vocabulary element using a plurality of modalities corresponding to different sensory stimuli to present the at least one unfamiliar vocabulary element to the individual, the lesson including a preview exercise indicating a number of vocabulary elements to be presented, a comprehension exercise including a contextual presentation with the unfamiliar vocabulary element omitted, and a recall exercise including repeated presentation of vocabulary elements until a correct response is provided for each;

for each exercise:

pausing for a time sufficient for the individual to respond to the at least one unfamiliar vocabulary element;

receiving a response from the individual based on the at least one unfamiliar vocabulary element;

evaluating the response based on a predetermined desired response criteria; and providing visual and audio feedback to the individual indicating correctness of the response, the visual feedback including an icon and the audio feedback including a synthesized voice.

2. The method of claim 1 wherein the plurality of modalities comprises audio, textual, and graphical representations of the at least one unfamiliar vocabulary element.

3. The method of claim 1 wherein providing feedback comprises generating a speech signal which includes a name of the individual.

4. The method of claim 1 wherein presenting comprises presenting an audio stimulus including a synthesized utterance and a visual representation of the at least one unfamiliar vocabulary element.

5. The method of claim 4 wherein presenting a visual representation comprises presenting a textual representation of the at least one unfamiliar vocabulary element.

6. The method of claim 4 wherein presenting a visual representation comprises presenting a graphical representation of the at least one unfamiliar vocabulary element.

7. The method of claim 1 wherein receiving comprises:
receiving a request from the individual indicative of difficulty in understanding the at least one unfamiliar vocabulary element; and
presenting the at least one unfamiliar vocabulary element in a context of familiar vocabulary elements.

8. The method of claim 1 wherein the step of receiving includes receiving a verbal response from the individual.

9. The method of claim 1 wherein presenting comprises presenting contextual information absent the at least one unfamiliar vocabulary element during the comprehension exercise and the recall exercise.

10. The method of claim 1 wherein the step of automatically presenting comprises:
randomly presenting each of the at least one unfamiliar vocabulary elements.

11. A system for training an individual to recognize and respond to at least one unfamiliar vocabulary element, the system comprising:
a display device for providing a visual representation of the at least one unfamiliar vocabulary element;
a speech synthesizer for providing an audio representation of the at least one unfamiliar vocabulary element;
at least one input device for generating a signal indicative of a response of the individual to the at least one unfamiliar vocabulary element; and
control logic in communication with the display device, the speech synthesizer and the at least one input device for selecting the at least one unfamiliar vocabulary element from a plurality of new and previously presented unfamiliar vocabulary elements, automatically presenting a lesson for the at least one unfamiliar vocabulary element using both the display device and the speech synthesizer, the lesson including a preview exercise indicating a quantity of vocabulary elements to be presented, a comprehension exercise including presentation of contextual information absent the unfamiliar vocabulary element, and a recall exercise, for each exercise pausing for a time sufficient for the individual to generate a response to the at least one unfamiliar vocabulary element, evaluating the response based on at least one desired response criterion, and providing visual and audio feedback to the individual using the display device and the speech synthesizer.

12. The system of claim 11 wherein the at least one input device comprises a microphone and wherein the control logic implements speech recognition to evaluate the response based on the at least one desired response criterion.

13. The system of claim 12 wherein the at least one input device comprises a microphone, a pointing device, and a keyboard.

14. The system of claim 11 wherein the control logic provides feedback by generating a speech signal using the speech synthesizer, the speech synthesizer generating an audio signal representing a name of the individual.

15. The system of claim 14 wherein the control logic communicates with the speech synthesizer and the display device to present an audio stimulus to the individual including a synthesized utterance and a visual representation of the at least one unfamiliar vocabulary element.

16. The system of claim 11 wherein the at least one input device is operative to receive a request from the individual indicative of difficulty in understanding the at least one unfamiliar vocabulary element and wherein the control logic communicates with the speech synthesizer to present the at least one unfamiliar vocabulary element to the individual in a context of familiar vocabulary elements.

17. A system for rapidly training an individual to recognize and respond to at least one unfamiliar vocabulary element without requiring complex cognitive tasks, the system comprising:
a display device for providing a visual representation of the at least one unfamiliar vocabulary element;
a speech synthesizer for providing an audio representation of the at least one unfamiliar vocabulary element;
a keyboard for generating a signal indicative of a response of the individual to the at least one unfamiliar vocabulary element;
a pointing device for generating a signal indicative of a response of the individual to the at least one unfamiliar vocabulary element;
a microphone for converting audio responses of the individual to corresponding electrical speech signals;
a speech recognition device in communication with the microphone for mapping the electrical signal to a predetermined vocabulary library; and
a computer in communication with the display device, the speech synthesizer, the keyboard, the pointing device, the microphone, and the speech recognition device for presenting the at least one unfamiliar vocabulary element to the individual using both the display device and the speech synthesizer in a series of exercises defining a lesson, the exercises including a preview exercise which presents a graphic indicative of a quantity of unfamiliar vocabulary elements to be presented, a comprehension exercise, and a recall exercise wherein each exercise includes pausing for a time sufficient for the individual to generate a response to the at least one unfamiliar vocabulary element, evaluating the response based on a desired response criteria, and providing feedback to the individual using both the display device and the speech synthesizer.

18. The method of claim 1 wherein the step of selecting comprises selecting at least one unfamiliar vocabulary element for every third lesson only from those previously presented.

19. The method of claim 1 wherein the step of presenting comprises presenting the at least one unfamiliar vocabulary element aurally and visually followed by a pause to allow a recited utterance from the user during the preview exercise.

* * * * *